United States Patent [19]

Iqbal

[11] Patent Number: 4,699,358
[45] Date of Patent: Oct. 13, 1987

[54] FAUCET VALVE WITH NOISE REDUCTION STRUCTURE

[75] Inventor: Muhammad Iqbal, Amherst, Ohio

[73] Assignee: Stanadyne, Inc., Windsor, Conn.

[21] Appl. No.: 896,886

[22] Filed: Aug. 15, 1986

[51] Int. Cl.⁴ .............................................. F16K 5/04
[52] U.S. Cl. .................................... 251/310; 251/117; 251/209
[58] Field of Search ............... 251/310, 209, 118, 117; 137/454.6

[56] References Cited

U.S. PATENT DOCUMENTS

| | | | |
|---|---|---|---|
| 3,542,337 | 11/1970 | Scanamucci | 251/209 |
| 4,058,289 | 11/1977 | Nichs | 251/209 X |
| 4,262,880 | 4/1981 | Nacho et al. | 251/209 X |
| 4,331,176 | 5/1982 | Parhiroy | 137/454.6 X |
| 4,395,018 | 7/1983 | Moen | 251/310 |
| 4,577,835 | 3/1986 | Holyeross, Jr. | 251/118 X |

*Primary Examiner*—A. Michael Chambers
*Assistant Examiner*—John C. Fox
*Attorney, Agent, or Firm*—Kinzer, Plyer, Dorn, McEachran & Jambor

[57] ABSTRACT

A fluid valve includes a sleeve having inlet and outlet ports. There is a stem movable within the sleeve between open and closed positions and having an inlet port and an outlet port. The stem inlet port is in communication with the sleeve inlet port and the stem outlet port is movable into registration or communication with the sleeve outlet port to define a path of flow through the valve. A seal is carried by the sleeve and cooperates with the movable stem to close the path of flow. There are means for reducing noise normally attendant to opening the valve which includes a passage in the sleeve directly adjacent the sleeve outlet port. The passage is in communication with the stem outlet port as the stem outlet port initially moves to open the path of flow to divert water and reduce pressure at the communicating outlet ports.

9 Claims, 5 Drawing Figures

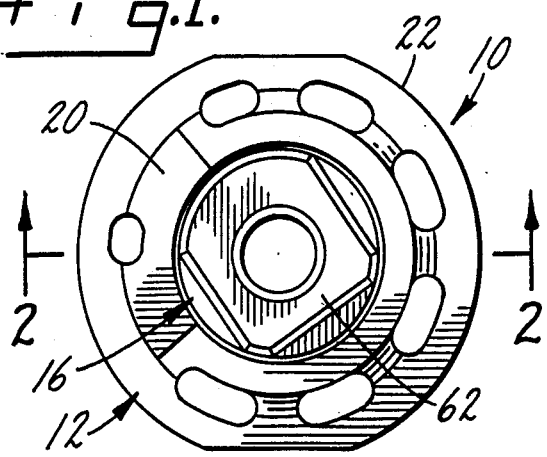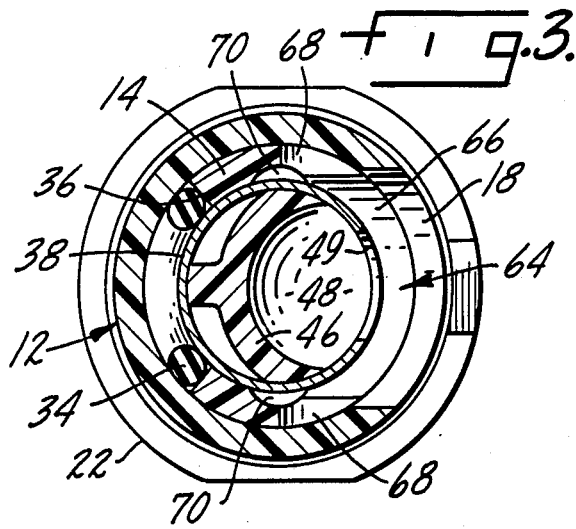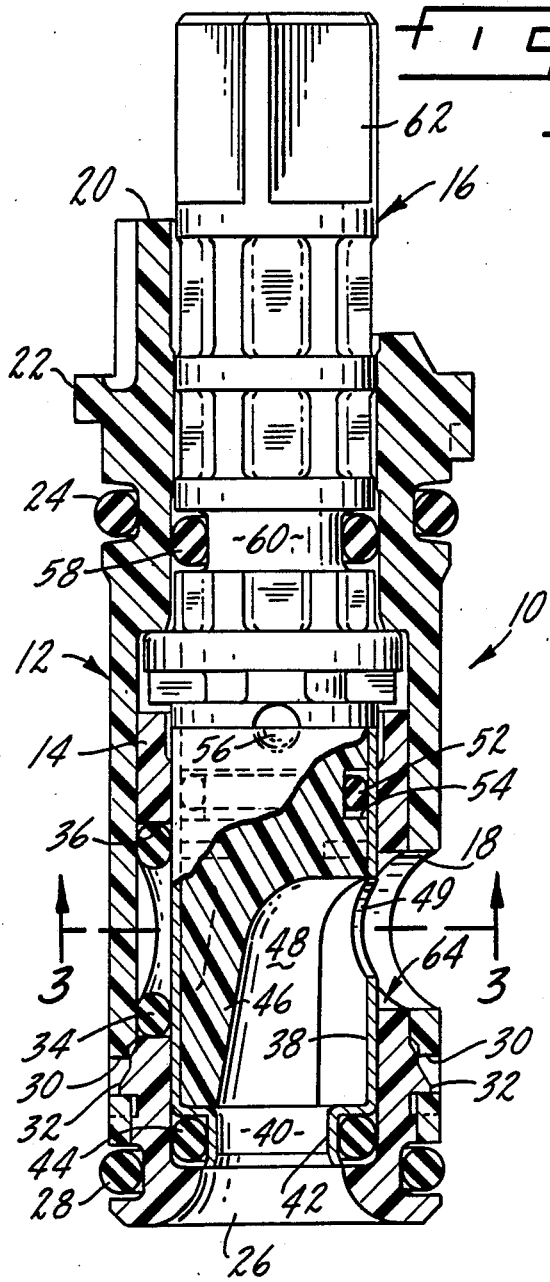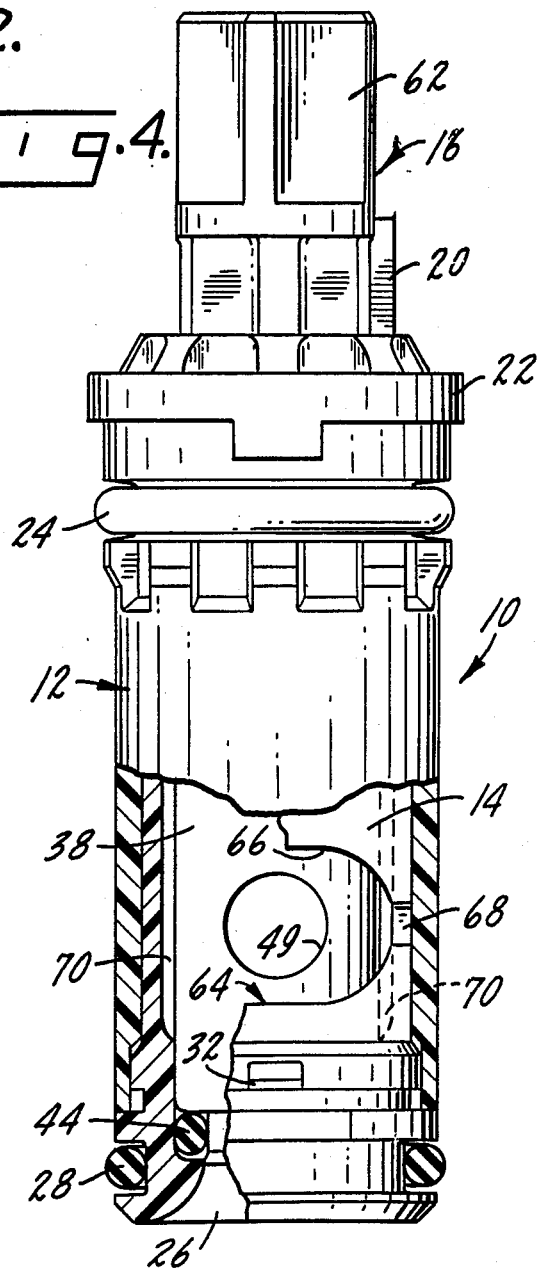

FAUCET VALVE WITH NOISE REDUCTION STRUCTURE

SUMMARY OF THE INVENTION

The present invention relates to faucet valves of the type shown in U.S. Pat. No. 4,395,018, assigned to the assignee of the present application. This application is specifically concerned with a means for reducing or suppressing noise when water is flowing through the valve.

A primary purpose of the invention is a fluid valve in which valve closure is brought about through the use of a seal out of the path of flow through the valve and in which there are means for reducing noise when the valve is open.

Another purpose is a fluid valve as described in which noise suppression is brought about by means of a passage which diverts a portion of the water flow at the initial opening of the valve, thereby reducing the noise normally associated with water turbulence.

Another purpose is a valve as described which provides for reducing the water pressure passing through initially aligned outlet ports as the valve is opened to suppress noise.

Another purpose is a valve as described in which the path of flow from the inlet to the outlet is smooth and gradually changes direction and size to reduce turbulence.

Another purpose is a two handle faucet valve of the type described in which there are no obstructions in the path of flow from the valve inlet to the outlet, thereby eliminating possible causes of turbulence and water noise.

Other purposes will appear in the ensuing specification, drawings and claims.

BRIEF DESCRIPTION OF THE DRAWINGS

The invention is illustrated diagrammatically in the following drawings wherein:

FIG. 1 is a top plan view of the valve as described herein,

FIG. 2 is a section along plane 2—2 of FIG. 1,

FIG. 3 is a section along plane 3—3 of FIG. 2,

FIG. 4 is a side view of the valve disclosed herein, with portions removed for illustrative purposes.

DESCRIPTION OF THE PREFERRED EMBODIMENT

Figure 5:
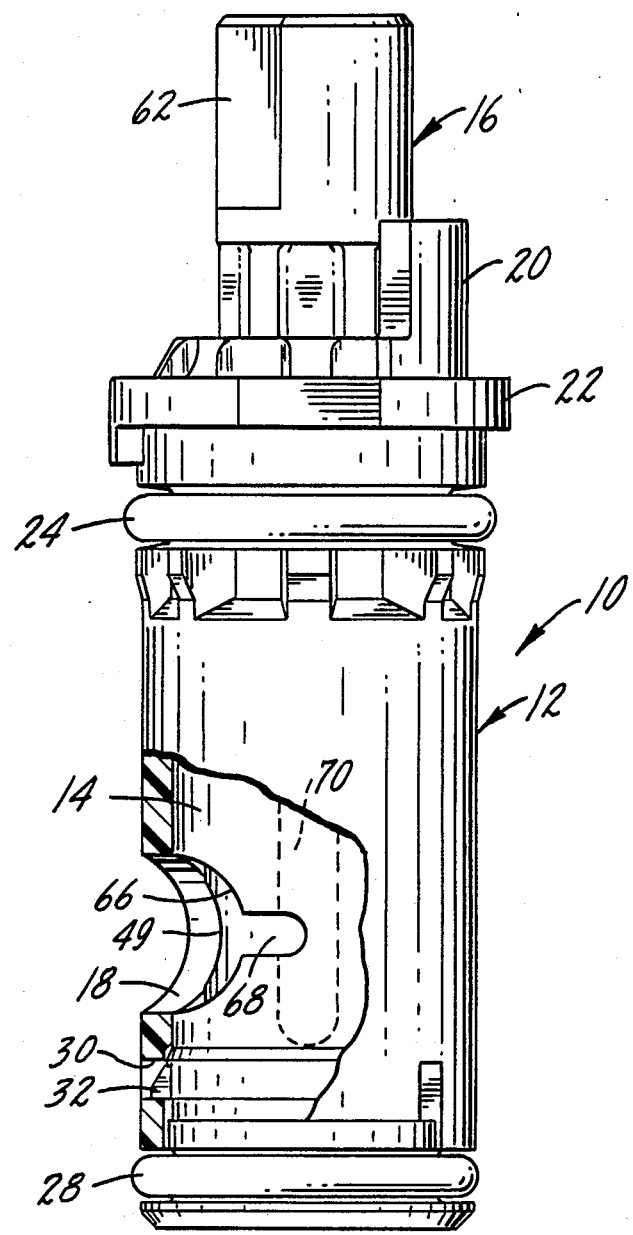
FIG. 5 is a further partial side view, with portions removed for illustrative purposes.

The fluid valve described herein has its primary use as a faucet, either in the kitchen or lavatory, or as a shower-tub control valve. The present invention is specifically directed to a means for suppressing noise in the valve shown in U.S. Pat. No. 4,395,018, assigned to the assignee of the present application.

In the valve of the '018 patent valve shutoff is accomplished by the use of an annular seal which is fixed in position on a sleeve and is out of the path of flow of water through the valve. The rotatable stem is turned until its outlet port faces the fixed annular seal which shuts off water flow through the valve. As the valve is opened, the outlet port on the movable stem will be initially only partially in communication with the outlet port on the sleeve and thus water must flow through a very small opening and must turn a very sharp corner. This causes substantial noise and water turbulence. The present invention reduces the noise incident in such valve opening by diverting a portion of the water or reducing water pressure within the movable stem through the use of a passage which is formed at the inside of the sleeve. Noise is further reduced by forming a smooth and unobstructed flow path from the stem inlet to the stem outlet.

In the drawings, the valve sleeve, which is indicated generally at 10, includes a sleeve member 12 and an internally positioned seal support 14. Mounted for movement within the sleeve 10 is a stem indicated generally at 16.

Sleeve member 12 is generally cylindrical in configuration and has an outlet port 18 which is oval in shape in that its circumferential length is somewhat greater than its height. The lower end of sleeve member 12 is open, as is the upper end through which stem 16 extends. The upper portion of sleeve member 12 has a stop 20 which cooperates with a handle on the stem for limiting stem rotation. There is an outwardly extending shoulder 22 on sleeve member 12 which limits the extent to which the valve can be inserted within a housing. A seal ring 24 prevents leakage along the outside of the sleeve member toward the handle end of the sleeve member.

The seal support 14 is also cylindrical in configuration and fits closely within sleeve member 12. The lower end of seal support 14 defines the sleeve inlet 26 which has a gradually tapering cross section so that the passage of water from outside of the valve to the inside of the valve will be smooth and turbulence will be kept at a minimum. Note that there are no obstructions at inlet 26, as there are in the valve shown in the '018 patent. The removal of this obstruction is for the purpose of eliminating noise caused by the turbulence brought about by such obstruction. The outside of seal support 14 carries a seal ring 28 which seals the lower end of the sleeve structure formed by the combination of the seal support and the sleeve member. These two elements are connected together by means of a plurality of openings 30 in the sleeve member 12 which cooperate with flexible hooks 32 formed on the exterior of the seal support, permitting the elements to be snapped together to form a unitary structure.

A valve closing seal ring is indicated at 34 and is supported at its exterior by the interior wall of sleeve member 12 and is held in place in the seal support by an annular wall 36.

Stem 16 includes an inner piston 38 which has an inlet port 40 in register or in communication with sleeve inlet 26. Piston 38 has a reduced area 42 at inlet 40, with the reduced area being surrounded by a seal ring 44 to prevent water at the inlet from reaching the outlet when the valve is closed. Positioned within piston 38 is a shaped lower portion 46 of the stem which defines a gradual and smooth water passage 48 from inlet 40 to piston outlet 49 which, in the position shown in FIG. 2, is in register with sleeve outlet 18. Water flowing from piston inlet 40 to piston outlet 49 must undergo a 90-degree change of direction and this change is made smooth and gradual by portion 46. The area of inlet 40 is slightly larger than outlet 49 and the transition from the larger inlet to the smaller outlet and the change in direction is linear. There is a seal ring 52 which is positioned within a groove 54 in portion 46 which seals the stem to the inside of the piston preventing leakage upwardly or outwardly from the piston.

Piston 38 will be staked, as at 56, to stem 16 so that movement of the stem by means of an exterior handle is effective to cause rotation of the piston. A seal ring 58 positioned within a groove 60 seals the exterior of the stem to the interior of sleeve member 12, preventing leakage up along the stem and outwardly through the handle of the valve. Stem 16 may have a handle receiving portion 62 at its outer end which will receive the conventional faucet handle.

Seal support 14 has an outlet port 64 in register with sleeve member outlet port 18 and which is in communication with outlet port 49 in piston 38 when the valve is open. The seal support outlet port has a generally central portion 66 similar in size and shape to sleeve member outlet port 18 in that it is oval and has essentially the same cross sectional area. However, seal support outlet port 64 has circumferential extensions on each side thereof, indicated at 68 in FIGS. 3 and 5. Extensions 68 extend circumferentially toward the valve closing seal 34 and terminate at axially extending passages 70, there being one such passage associated with each extension 68 and with the passages extending axially toward the exterior of the valve. There is a passage 70 on each side of the valve, as the valve can be used on either the hot or cold water side of a lavatory or kitchen sink configuration, and thus the valve must be symmetrical.

When the valve is closed, outlet port 49 of the piston will face valve closing seal 34 and no water will flow through the valve. As the valve stem is turned toward an open position, the first passage of water will take place when piston outlet port 49 first is in communication with the end of an extension 68 of seal support outlet port 64. The initial opening is small and the pressure of the water at this point is very substantial because the opening is small. It is for this reason that the diverter passages 70 have been formed at the interior of the seal support, as a portion of the water trying to flow through the partially aligned openings of the piston and the seal support will be diverted into one of the passages 70. This will reduce the pressure at the aligned ports as the valve is opened and thus reduce the turbulence and noise normally attendant to valve opening.

As continued turning of stem 16 will place greater portions of piston outlet port 49 in register with seal support outlet 64 and sleeve member outlet 18, there is less of a constriction to water flow, and thus less turbulence, and, accordingly, a reduction in noise as the valve is opened. The primary concern in valve opening is that initial time when piston port 49 first comes in register with a seal support outlet port extension 68 and it is for this reason that passages 70 are placed at this location so as to divert water during the initial opening of the valve.

Whereas the preferred form of the invention has been shown and described herein, it should be realized that there may be many modifications, substitutions and alterations thereto.

The embodiments of the invention in which an exclusive property or priviledge is claimed are defined as follows:

1. A fluid valve including sleeve means, inlet and outlet port means in said sleeve means, a stem movable within said sleeve means between open and closed positions and having inlet and outlet ports, said stem inlet port being in communication with said sleeve means inlet port means, said stem outlet port being movable into register with said sleeve means outlet port means to thereby define a path of flow through said valve from said communicating stem inlet port and sleeve means inlet port means through said stem object port and said sleeve means outlet port means, seal means carried by said sleeve means and cooperating with said movable stem to close said path of flow, and means for reducing noise attendant to opening said fluid valve including a fluid diverting passage to said sleeve means directly adjacent and communicating with the outlet means therein, said passage communicating with said stem outlet port as said stem outlet port initially moves to open said path of flow to divert fluid away from said sleeve means outlet means whereby pressure at said communicating sleeve means outlet port means and stem outlet port is reduced by water flow into said passage.

2. The fluid valve of claim 1 further characterized in that said seal means includes a fixed seal member which is at least in part annular, with the annulus being arranged about an axis perpendicular to the axis of said stem, said seal member being spaced from said sleeve means outlet port means with said path of flow through said valve never being through said seal member at any position of said stem.

3. The fluid valve of claim 1 further characterized in that said sleeve means includes a seal support and a sleeve with said seal support being positioned within said sleeve, said passage being formed in said seal support.

4. The fluid valve of claim 3 further characterized in that said passage extends generally axially within said seal support.

5. The fluid valve of claim 4 further characterized by and including a pair of diammetrically opposed passages formed within said seal support, said seal support including an outlet opening, with each of said passages being positioned adjacent an edge of said outlet opening.

6. The fluid valve of claim 5 further characterized in that said sleeve and seal support have generally aligned and similarly sized outlet openings, with said seal support outlet opening having, at opposite sides thereof, circumferentially extending areas of reduced cross section, with each of said seal support passages being adjacent and in communication with an end of said opening areas of reduced cross section.

7. The fluid valve of claim 1 further characterized in that said sleeve means inlet port means is unobstructed.

8. The fluid valve of claim 1 further characterized in that said stem inlet port faces in a direction approximately at right angles to the direction of said stem outlet port, with the path of flow within said stem between its inlet and outlet ports gradually changing in direction to reduce noise and turbulence of water flowing therebetween.

9. The fluid valve of claim 8 further characterized in that said stem inlet port is slightly larger in area than said stem outlet port with the path of flow therebetween gradually changing in size.

* * * * *